(12) United States Patent
Li et al.

(10) Patent No.: US 12,221,368 B2
(45) Date of Patent: Feb. 11, 2025

(54) POLYHEDRAL SPHERICAL DENITRIFYING PACKING AND USE METHOD THEREOF

(71) Applicant: Zhihe Environmental Science and Technology Co., Ltd, Zhengzhou (CN)

(72) Inventors: Haisong Li, Zhengzhou (CN); Dengke Yan, Zhengzhou (CN); Xiaolei Chen, Zhengzhou (CN); Zicong Xu, Zhengzhou (CN); Peiji Hu, Zhengzhou (CN); Wang Cao, Zhengzhou (CN)

(73) Assignee: Zhihe Environmental Science and Technology Co., Ltd, Zhengzhou (CN)

( * ) Notice: Subject to any disclaimer, the term of this patent is extended or adjusted under 35 U.S.C. 154(b) by 154 days.

(21) Appl. No.: 18/322,544

(22) Filed: May 23, 2023

(65) Prior Publication Data
US 2024/0182336 A1 Jun. 6, 2024

(30) Foreign Application Priority Data
Dec. 3, 2022 (CN) .......................... 202211540721.2

(51) Int. Cl.
*C02F 3/28* (2023.01)
*C02F 3/10* (2023.01)

(52) U.S. Cl.
CPC .............. *C02F 3/2806* (2013.01); *C02F 3/10* (2013.01); *C02F 3/108* (2013.01); *C02F 3/109* (2013.01); *C02F 3/2833* (2013.01); *Y02W 10/10* (2015.05)

(58) Field of Classification Search
CPC .......... C02F 3/2806; C02F 3/10; C02F 3/108; C02F 3/109; C02F 3/2833; Y02W 10/10
(Continued)

(56) References Cited

U.S. PATENT DOCUMENTS

2021/0155515 A1* 5/2021 Zhou ....................... C02F 3/34

FOREIGN PATENT DOCUMENTS

CN 211310999 U 8/2020
CN 113735260 A 12/2021
(Continued)

OTHER PUBLICATIONS

Machine-generated English translation of KR 101142326, generated on Dec. 2, 2024.*
(Continued)

*Primary Examiner* — Fred Prince
(74) *Attorney, Agent, or Firm* — Jordan IP Law, LLC; Todd A. Vaughn

(57) ABSTRACT

Provided are a polyhedral spherical denitrifying packing and a use method thereof. An outer surface of the polyhedral spherical denitrifying packing is composed of a plurality of conical pieces, and each of the conical pieces has a vacancy. The method for using the packing above includes: placing the polyhedral spherical denitrifying packing in packing area; adding inoculation sludge into the packing area, and forming biofilm; feeding raw sewage into the packing area through a water inlet of the denitrification reactor, subjecting the sewage to denitrification reaction when flowing through the packing area with the biofilm; refeeding a part of sewage discharged from the packing area into the packing area through the water inlet of the denitrification reactor via a circulating tube; making the other part of the sewage discharged from the packing area flow into clarification area, and discharging through a water outlet of the denitrification reactor.

4 Claims, 2 Drawing Sheets

(58) Field of Classification Search
USPC .................................................. 210/615, 903
See application file for complete search history.

(56) References Cited

FOREIGN PATENT DOCUMENTS

CN 114314835 A 4/2022
KR 101142326 B1 * 5/2012

OTHER PUBLICATIONS

Environmental Protection Equipment Materials Manual 2nd Edition, p. 595 (2023).

* cited by examiner

POLYHEDRAL SPHERICAL DENITRIFYING PACKING AND USE METHOD THEREOF

CROSS REFERENCE TO RELATED APPLICATION

The present application claims priority to Chinese Patent Application No. 202211540721.2 (filed on Dec. 3, 2022), the entire content of which is incorporated herein by reference in its complete entirety.

TECHNICAL FIELD

The present disclosure belongs to the technical field of sewage treatment, and in particular to a polyhedral spherical denitrifying packing and a use method thereof, so as to overcome the shortcomings of a traditional denitrifying packing in practical application and realize efficient denitrification by designing a denitrifying fluidized packing with a novel configuration.

BACKGROUND

At present, the activated sludge method and the biofilm method are commonly used to treat municipal sewage or industrial wastewater. Owing to the advantages of high organic load, short contact retention time, reduced floor area, cost-effectiveness, impact load resistance, and low residual sludge yield, the biofilm method is widely used. The biofilm method includes many operation modes such as fixed bed and fluidized bed, and the core of the biofilm method lies in the selection and control of the packing. The packing has many defects in the fixed bed operation mode, such as short circuit, blockage, and nonuniform mass transfer, leading to a poor treatment performance. In the fluidized bed operation mode, on the other hand, the packing moves irregularly in the reactor under high hydraulic impact. The packing collides with each other, which makes the packing surface fully in contact with the substrates and increases the specific surface area available for microbial attachment. The mass transfer of the reactor is more uniform. However, the existing denitrifying fluidized packing has the following problems: (1) the packing such as the commercially available corrugated plate and rosette packing has a limited specific surface area for microbial attachment; (2) the packing such as quartz sand and ceramsite readily stack together at the bottom of the reactor due to the large density, such that it cannot be fluidized, is easy to cause blockage, and needs frequent backwashing; (3) the packing, such as K1 and K3, has the problems of non-uniform mass transfer due to their configuration defects; although there is a large specific surface area, the biofilm could be formed mainly inside the packing, which has a small pore size and is easy to be blocked; (4) previous researches suggested that excellent mass transfer and high reaction rate could be achieved when the thickness of the biofilm is less than 200 μm; heterotrophic denitrifying bacteria proliferate rapidly, so it is necessary to activate the biofilm on the surface of the packing and detach aging biofilm frequently to ensure the appropriate biofilm thickness; however, defects in the configuration, material, and density of the packing easily lead to difficulties in biofilm detachment; (5) other issues of existing packing remain, such as low mechanical strength, easy wear, and a short service life; various reasons lead to substandard effluent; therefore, it is particularly important to innovate the denitrifying packing by improving the configuration and material, enlarging the effective specific surface area, and reasonably regulating the specific gravity.

In view of the shortcomings and problems of the existing packing, the present disclosure provides a novel efficient polyhedral spherical denitrifying fluidized packing and a use method thereof, which could realize an efficient denitrification, and by combining the packing with an adaptive reactor, the defects of the traditional denitrifying fluidized packing itself could be overcome, and the difficulties in operation and control could be solved.

The present disclosure provides a novel efficient polyhedral spherical denitrifying fluidized packing and a use method thereof, which solves the problems existing in the traditional denitrifying fluidized packing through a new design for packing configuration and material.

SUMMARY

In view of the defects in the prior art, in combination with the background, the present disclosure provides a novel efficient polyhedral spherical denitrifying fluidized packing and a use method thereof.

The present disclosure provides the following technical solutions.

In one aspect of the present disclosure, provided is a polyhedral spherical denitrifying packing, which has an overall structure that is a polyhedral sphere with a hollow interior, and an outer surface that is composed of a plurality of conical pieces. The polyhedral spherical denitrifying packing may be prepared by conventional means such as three-dimensional (3D) printing.

Each of the conical pieces is composed of a plurality of isosceles right triangles and equilateral triangles, has a height of 10-20 mm, and has a vacancy.

A distance from a center of the sphere of the polyhedral spherical denitrifying packing to a bottom of each of the conical pieces is defined as an inner diameter of the polyhedral sphere, which is in a range of 15-40 mm.

The polyhedral spherical denitrifying packing may be prepared from one of polyethylene and polypropylene, one of calcium carbonate and talcum powder, and glass fiber at a mass ratio of (80-95):(1-10):(1-10).

In another aspect of the present disclosure, provided is a method for using the packing in an adaptive denitrification reactor, comprising:
  placing the polyhedral spherical denitrifying packing in a packing area;
  adding inoculation sludge into the packing area and forming a biofilm;
  feeding a raw sewage into the packing area through a water inlet of the denitrification reactor, and subjecting the sewage to a denitrification reaction when flowing through the packing area with the biofilm;
  refeeding a part of sewage discharged from the packing area into the packing area through the water inlet of the reactor via a circulating tube;
  making the other part of the sewage discharged from the packing area flow into a clarification area, and discharging through a water outlet (7) of the denitrification reactor;
  wherein, in the packing area, the polyhedral spherical denitrifying packing is in an excellent fluidized state under an action of a circulating pump.

A filling ratio of the polyhedral spherical denitrifying packing is 25-60%. The filling ratio refers to a ratio of the volume of the polyhedral spherical denitrifying packing to the total volume of the denitrification reactor.

The packing provided in the present disclosure is greatly improved compared with a commercially available traditional packing such as K1, K3, corrugated plate, rosette, quartz sand, and ceramsite packing.

In terms of density, by adjusting the ratio of different raw materials, the density of the packing may be regulated, which is more conducive to the fluidization of the packing in the reactor, and solves the problem of blockage caused by stacking of the packing at the top or bottom of the reactor due to the nonadjustable density of the traditional packing. Furthermore, operation for the packing in the fluidized state ensures uniform mass transfer in the reactor, facilitates the release of nitrogen generated by denitrification from the reaction area, and avoids the problem of reaction efficiency reduction caused by the delayed gas release due to the blockage of the packing. In addition, adjusting the density of the packing can reduce the energy consumption required for good fluidization and the washing frequency of the reactor, thus leading to significant cost savings. After a lot of experiments, a preferred density of the packing is determined to be in the range of 0.98-1.2 $g/cm^3$.

In terms of composition, the added calcium carbonate or talcum powder and glass fiber increase the hardness and rigidity of the packing, and could absorb 30-80% of the incident ultraviolet light, thus preventing the aging of the packing, and prolonging the service life of the packing. In addition, the addition of glass fiber is conducive to the detachment of aging biofilm and activation of biofilm, and the efficient and stable operation of the reactor.

In terms of configuration, with the polyhedral spherical structure, the packing could easily rotate in the reactor, which is more conducive to mass transfer and improves the reaction efficiency. The design of the vacancy on the conical piece of the packing makes it possible to maintain an anoxic environment during the washing of the reactor, so as to ensure that denitrifiers are not affected by washing, avoid the reduction of the activity of functional microorganisms, and guarantee high efficiency and high load operation of the reactor.

DRAWINGS

DESCRIPTION

The present disclosure will be further described with reference to the accompanying drawings.

Figure 1:
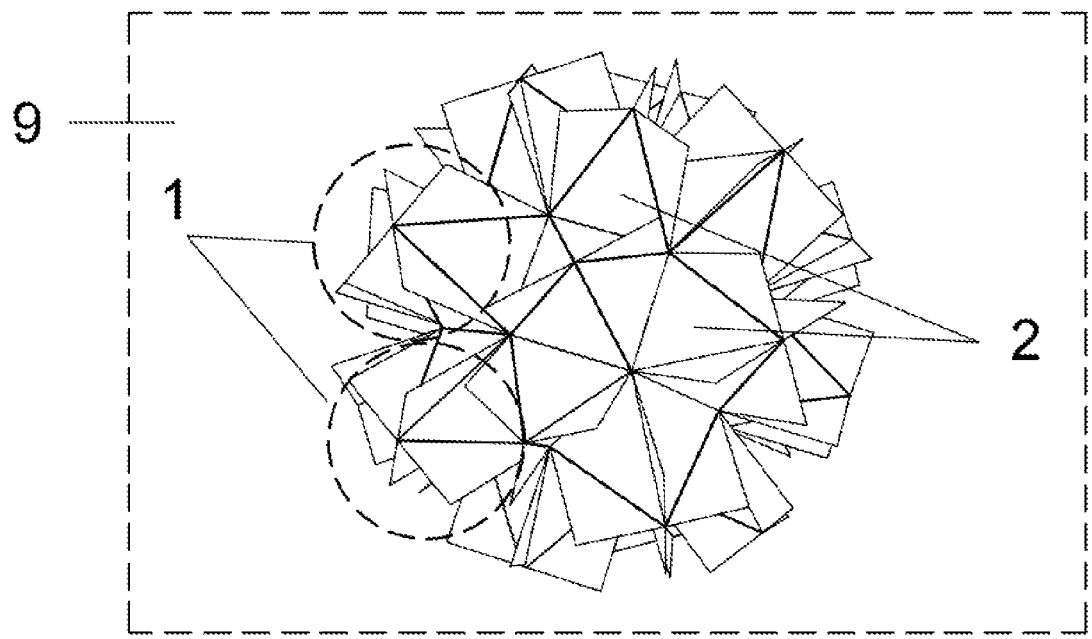
FIG. 1 is a schematic diagram of a polyhedral spherical denitrifying packing according to an embodiment of the present disclosure.
Figure 2A:
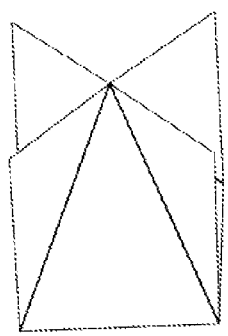
FIGS. 2A and 2B show the detailed structure of a conical piece.
Figure 2B:
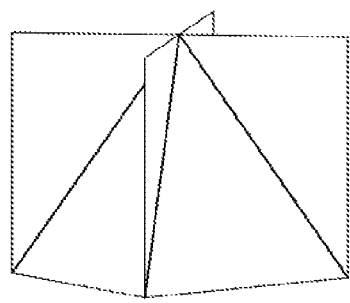
Figure 3:
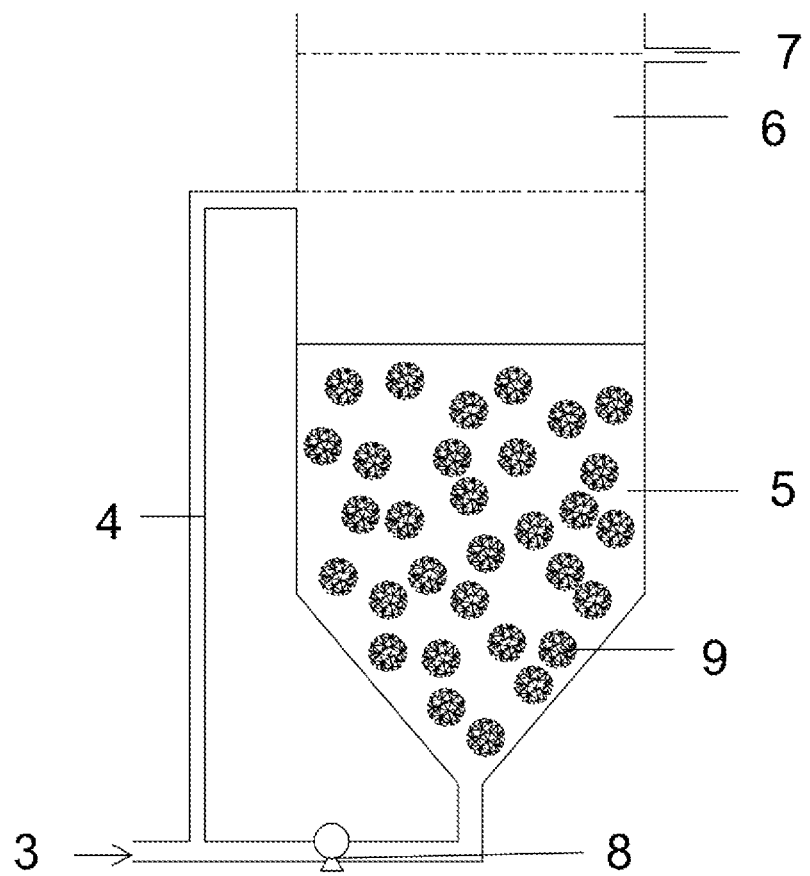
FIG. 3 is a schematic structural diagram of a denitrification reactor.

An assembled denitrification reactor is shown in FIG. 3. A process for a packing running in a reactor is described as follows.

The polyhedral spherical denitrifying packing 9 is placed in a packing area 5. The inoculation sludge is a sludge from a secondary sedimentation tank of a municipal sewage treatment plant, and a sludge concentration was 3,000-5,000 mg/L. After biofilm formation, a raw sewage is fed into the packing area 5 through a water inlet 3 of the denitrification reactor, and then subjected to a denitrification reaction when flowing through the packing area 5 with the biofilm, a part of sewage discharged from the packing area 5 is re-fed into the packing area 5 through the water inlet 3 of the reactor via a circulating tube 4, and the polyhedral spherical denitrifying packing 9 is in an excellent fluidized state under an action of a circulating pump 8. The other part of the sewage discharged from the packing area 5 flows through a clarification area and is discharged from the reactor through a water outlet 7 of the denitrification reactor.

Example 1

A denitrification experiment was conducted in a reactor with a packing provided in the present disclosure. Polypropylene, calcium carbonate, and glass fiber were prepared into the packing with a density of 1.03 $g/cm^3$ at a mass ratio of 93:4:3. The filling ratio was 30%. The packing had an inner diameter of 15 mm, and a conical piece had a height of 10 mm. The total nitrogen concentration in the influent (i.e., raw sewage) was about 20 mg/L (including kjeldahl nitrogen<1 mg/L). The hydraulic retention time was 20 min. After 5 days of start-up, the total nitrogen in the effluent (i.e., treated sewage that is discharged from the denitrification reactor) of the reactor reached no more than 1.5 mg/L; the water quality was stable, and the total nitrogen removal efficiency was higher than 90%. Long-term operation monitoring for the reactor showed that the packing in the reactor was in an excellent fluidized state, the effluent quality was stable, and no blockage of the packing was observed. According to the requirements for biofilm thickness, the packing was washed regularly for aging biofilm detachment, with a frequency was about once every 10 days. The specific monitoring situation is shown in Table 1.

TABLE 1

Monitoring data of Example 1

| Running time d | Total nitrogen of influent mg/L | Total nitrogen of effluent mg/L | Running status record |
|---|---|---|---|
| 1 | 20.5 | 11.9 | The packing is in an excellent fluidized state, and microorganisms are mainly deposited on the surface of the packing, with a small amount attached to the packing |
| 2 | 20.5 | 7.5 | Microorganisms on the surface of the packing increase obviously |
| 3 | 20.5 | 4.4 | A biofilm is initially formed on the surface of the packing |
| 4 | 20.2 | 1.8 | The biofilm thickens gradually, and the packing is in an excellent fluidized state |
| 5 | 20.2 | 1.3 | The packing is in an excellent fluidized state, and the reactor runs stably |
| 6 | 20.2 | 1.0 | The thickness of the biofilm is approximately 180 μm |
| 7 | 20.5 | 1.2 | The packing is in an excellent fluidized state, and the reactor runs stably |
| 8 | 20.5 | 1.3 | The reactor runs stably |
| 9 | 20.5 | 1.0 | The reactor runs stably |
| 10 | 20.0 | 1.1 | The reactor runs stably, and the thickness of the biofilm is approximately 200 μm |
| 20 | 20.2 | 1.3 | The thickness of the biofilm is approximately 270 μm, and washing is conducted; the thickness of the biofilm is approximately 150 μm after washing |
| 25 | 20.1 | 1.2 | The reactor runs stably, and the thickness of the biofilm is approximately 190 μm |
| 30 | 20.2 | 1.0 | The packing is in an excellent fluidized state, and the thickness of the biofilm is approximately 250 μm, and washing is conducted; the thickness of the biofilm is approximately 170 μm after washing |

TABLE 1-continued

Monitoring data of Example 1

| Running time d | Total nitrogen of influent mg/L | Total nitrogen of effluent mg/L | Running status record |
|---|---|---|---|
| 40 | 20.5 | 1.1 | Washing is conducted, and the reactor runs stably |
| 50 | 20.0 | 1.3 | Washing is conducted, and the reactor runs stably |
| 60 | 20.1 | 1.2 | Washing is conducted, and the reactor runs stably |

Example 2

A denitrification experiment was conducted in a reactor with a packing provided in the present disclosure. Polypropylene, calcium carbonate and glass fiber were prepared into the packing with a density of 1.14 g/cm$^3$ at a mass ratio of 85:10:5. The filing ratio was 40%. The packing had an inner diameter of 40 mm, and a conical piece had a height of 20 mm. The total nitrogen concentration in the influent (i.e., raw sewage) was about 15 mg/L (including kjeldahl nitrogen<1 mg/L). The hydraulic retention time was 15 min. After 5 days of start-up, the total nitrogen in the effluent (i.e., treated sewage that is discharged from the denitrification reactor) of the reactor reached no more than 1.5 mg/L, the water quality was stable, and the total nitrogen removal efficiency was higher than 90%. Long-term operation monitoring for the reactor showed that the packing in the reactor was in an excellent fluidized state, the effluent quality was stable, and no blockage of the packing was observed. According to the requirements for biofilm thickness, the packing was washed regularly for aging biofilm detachment, with a frequency was about once every 15 days. The specific monitoring situation is shown in Table 2.

TABLE 2

Monitoring data of Example 2

| Running time d | Total nitrogen of influent mg/L | Total nitrogen of effluent mg/L | Running status record |
|---|---|---|---|
| 1 | 15.2 | 9.2 | The packing is in an excellent fluidized state, and microorganisms are mainly deposited on the surface of the packing, with a small amount attached to the packing |
| 2 | 15.2 | 6.4 | Microorganisms on the surface of the packing increase |
| 3 | 15.2 | 4.4 | A thin biofilm is formed on the surface of the packing |
| 4 | 15.1 | 2.0 | The biofilm thickens gradually, and the packing is in an excellent fluidized state |
| 5 | 15.1 | 1.2 | The packing is in an excellent fluidized state, and the reactor runs stably |
| 6 | 15.2 | 1.1 | The thickness of the biofilm is about 150 μm |
| 7 | 15.2 | 1.1 | The packing is in an excellent fluidized state, and the reactor runs stably |
| 8 | 15.2 | 1.2 | The reactor runs stably |
| 9 | 15.2 | 1.3 | The reactor runs stably |
| 10 | 15.0 | 1.0 | The reactor runs stably, and the thickness of the biofilm is about 180 μm |

TABLE 2-continued

Monitoring data of Example 2

| Running time d | Total nitrogen of influent mg/L | Total nitrogen of effluent mg/L | Running status record |
|---|---|---|---|
| 15 | 15.1 | 1.4 | The thickness of the biofilm is about 250 μm, and washing is conducted; the thickness of the biofilm is about 160 μm after washing |
| 20 | 15.2 | 1.1 | The packing is in an excellent fluidized state, and the reactor runs stably |
| 25 | 15.5 | 1.1 | The reactor runs stably, and the thickness of the biofilm is about 180 μm |
| 30 | 15.1 | 1.2 | The packing is in an excellent fluidized state, and the thickness of the biofilm is about 230 μm, and washing is conducted; and the thickness of the biofilm is about 150 μm after washing |
| 35 | 15.4 | 1.0 | The packing is in an excellent fluidized state, and the reactor runs stably |
| 40 | 15.2 | 1.1 | The packing is in an excellent fluidized state, and the reactor runs stably |
| 45 | 15.3 | 1.2 | The packing is in an excellent fluidized state, and the thickness of the biofilm is about 250 μm; washing is conducted, and the thickness of the biofilm is about 160 μm after washing |
| 50 | 15.0 | 1.1 | The reactor runs stably |
| 55 | 15.2 | 1.3 | The reactor runs stably |
| 60 | 15.1 | 1.0 | The packing is in an excellent fluidized state, and the thickness of the biofilm is about 240 μm; washing is conducted, and the thickness of the biofilm is about 150 μm after washing |

Comparative Example 1

A denitrification experiment was conducted in a reactor with the commercially available polyethylene K3 packing. The packing had a density of 0.95 g/cm$^3$ and a packing ratio was 30%. Other conditions were the same as those in Example 1, that is, the total nitrogen concentration in the influent was about 20 mg/L (including kjeldahl nitrogen<1 mg/L), and the hydraulic retention time was 20 min. The removal rate was only about 60% when the reactor run to 10th days, and due to the limitation of packing density, there was obvious blockage, which required daily washing. In addition, biofilm detachment of the aging biofilm inside the packing cannot realized due to the configuration of K3, and the reaction efficiency was low. The specific monitoring situation is shown in Table 3.

TABLE 3

Monitoring data of Comparative Example 1

| Running time d | Total nitrogen of influent mg/L | Total nitrogen of effluent mg/L | Running status record |
|---|---|---|---|
| 1 | 20.5 | 15.2 | The packing floats on the upper part of the reactor, and microorganisms are mainly deposited on the surface of the packing without obvious attachment |

TABLE 3-continued

Monitoring data of Comparative Example 1

| Running time d | Total nitrogen of influent mg/L | Total nitrogen of effluent mg/L | Running status record |
|---|---|---|---|
| 2 | 20.5 | 14.2 | The microorganisms initially attach to the packing, and the packing is stacked on the upper part of the reactor and cannot be fluidized under conventional hydraulic conditions |
| 3 | 20.5 | 13.6 | The reactor is blocked, and is washed once |
| 4 | 20.2 | 12.0 | The biofilm on the surface of the packing thickens gradually, and the reactor runs stably |
| 5 | 20.2 | 11.1 | There is some blockage in the reactor, and the reactor is washed once |
| 6 | 20.2 | 10.1 | Stable running of the reactor is maintained |
| 7 | 20.5 | 9.5 | The reactor is washed to maintain stable running |
| 8 | 20.5 | 9.2 | The reactor is washed to maintain stable running |
| 9 | 20.5 | 8.3 | The reactor is washed to maintain stable running |
| 10 | 20.0 | 8.1 | The reactor is washed to maintain stable running |
| 15 | 20.2 | 8.2 | The reactor is washed to maintain stable running |
| 20 | 20.1 | 7.9 | The reactor is washed to maintain stable running |
| 25 | 20.2 | 8.4 | The reactor is washed to maintain stable running |
| 30 | 20.5 | 8.2 | The reactor is washed to maintain stable running |

Comparative Example 2

A denitrification experiment was conducted in a reactor with the commercially available polypropylene rosette packing. The packing had a density of 0.92 g/cm³ and a filling ratio was 40%. Other conditions were the same as those in Example 2, that is, the total nitrogen concentration in the influent was about 15 mg/L (including kjeldahl nitrogen<1 mg/L), and the hydraulic retention time was 15 min. The removal rate was only about 50% when the reactor run to 15th days, and due to the limitation of packing composition and configuration, the specific surface area of the packing was small, the effective biomass in the reactor was small, and the space for improvement of reaction efficiency was limited. The specific monitoring situation is shown in Table 4.

TABLE 4

Monitoring data of Comparative Example 2

| Running time d | Total nitrogen of influent mg/L | Total nitrogen of effluent mg/L | Running status record |
|---|---|---|---|
| 1 | 15.2 | 14.5 | The packing floats on the upper part of the reactor, the sludge is deposited at the bottom of the reactor, and there is no microorganism attached to the surface of the packing |
| 2 | 15.2 | 13.6 | The sludge at the bottom of the reactor is stirred to accelerate the biofilm attachment |
| 3 | 15.2 | 13.2 | The biofilm is formed initially on the surface of packing |
| 4 | 15.1 | 11.7 | The microorganisms amount on the surface of the packing increases slowly |
| 5 | 15.1 | 10.3 | The biofilm continues to thicken |
| 6 | 15.2 | 9.8 | The thickness of the biofilm is about 100 μm |
| 7 | 15.2 | 9.5 | There is no obvious change in the biofilm, and the reactor runs normally |
| 8 | 15.2 | 9.5 | There is no obvious change in the biofilm, and the reactor runs normally |
| 9 | 15.2 | 8.2 | There is no obvious change in the biofilm, and the reactor runs normally |
| 10 | 15.0 | 8.6 | There is no obvious change in the biofilm, and the reactor runs normally |
| 15 | 15.1 | 7.2 | The microorganisms on the surface of the packing tend to be stable, and the thickness of the biofilm is about 150 μm |
| 20 | 15.2 | 7.0 | The reactor runs normally |
| 25 | 15.5 | 7.6 | The reactor runs normally |
| 30 | 15.1 | 7.1 | The reactor runs normally, and the thickness of the biofilm is about 170 μm |

Comparative Example 3

A denitrification experiment was conducted in a reactor with a quartz sand packing. The packing had a density of 2.65 g/cm³ and a filling ratio of 30%. Other conditions were the same as those in Example 1, that is, the total nitrogen concentration in the influent was about 20 mg/L (including kjeldahl nitrogen<1 mg/L), and the hydraulic retention time was 20 min. The removal rate was about 60% when the reactor run to 15th days, but due to the high density of the packing, the packing was piled up at the bottom of the reactor and could not be fluidized, so it was necessary to wash the reactor twice a day to alleviate the blockage. The specific monitoring situation is shown in Table 5.

TABLE 5

Monitoring data of Comparative Example 3

| Running time d | Total nitrogen of influent mg/L | Total nitrogen of effluent mg/L | Running status record |
|---|---|---|---|
| 1 | 20.5 | 17.5 | The packing is stacked at the bottom of the reactor, and the sludge is deposited on the surface |
| 2 | 20.5 | 15.0 | The biofilm is formed initially on the surface of packing |
| 3 | 20.5 | 13.2 | The reactor is blocked at the bottom, and is washed once |
| 4 | 20.2 | 11.7 | There are too many microorganisms on the surface of packing, and there is a tendency of blockage |

TABLE 5-continued

Monitoring data of Comparative Example 3

| Running time d | Total nitrogen of influent mg/L | Total nitrogen of effluent mg/L | Running status record |
|---|---|---|---|
| 5 | 20.2 | 11.3 | The biofilm continues to thicken, and the reactor is blocked, and is washed once |
| 6 | 20.2 | 10.8 | Washing is conducted once, and the reactor runs normally |
| 7 | 20.5 | 10.5 | Washing is conducted twice, and the reactor runs normally |
| 8 | 20.5 | 9.5 | Washing is conducted twice, and the reactor runs normally |
| 9 | 20.5 | 9.2 | Washing is conducted twice to maintain stable running |
| 10 | 20.0 | 8.6 | Washing is conducted twice to maintain stable running |
| 15 | 20.2 | 8.2 | Washing is conducted twice to maintain stable running |
| 20 | 20.1 | 8.0 | Washing is conducted twice to maintain stable running |
| 25 | 20.2 | 8.3 | Washing is conducted twice to maintain stable running |
| 30 | 20.5 | 8.2 | Washing is conducted twice to maintain stable running |

It can be seen from Example 1, Comparative Example 1 and 3 that the density of the packing of the present disclosure is easier for fluidized, thus avoiding the blockage, reducing the washing frequency and saving the running cost. In addition, the reactor has obvious advantages of short start-up time, high reaction rate, and lower effluent concentration.

It can be seen from Example 2 and Comparative Example 2 that the packing of the present disclosure has obvious advantages such as large specific surface area, high effective biomass, fast reaction efficiency improvement and low effluent concentration.

In conclusion, the polyhedral spherical packing of the present disclosure has high denitrification efficiency and convenient operation, and the configuration, density and composition of the packing in the present disclosure have significant advantages.

LIST OF REFERENCE SYMBOLS

1—conical piece
2—vacancy
3—water inlet of the denitrification reactor
4—circulating tube
5—packing area
6—clarification area
7—water outlet of the denitrification reactor
8—circulating pump
9—polyhedral spherical packing

What is claimed is:

1. A method for using a polyhedral spherical denitrifying packing in a denitrification reactor, the polyhedral spherical denitrifying packing having an outer surface composed of a plurality of conical pieces, each conical piece having a vacancy, the method comprising:
    placing the polyhedral spherical denitrifying packing in a packing area;
    adding inoculation sludge into the packing area, and forming a biofilm;
    feeding a raw sewage into the packing area through a water inlet of the denitrification reactor, and subjecting the sewage to a denitrification reaction when flowing through the packing area with the biofilm;
    refeeding a part of sewage discharged from the packing area into the packing area through the water inlet of the denitrification reactor via a circulating tube; and
    making the other part of the sewage discharged from the packing area flow into a clarification area, and discharging through a water outlet of the denitrification reactor,
    wherein, in the packing area, the polyhedral spherical denitrifying packing is in an excellent fluidized state under an action of a circulating pump,
    wherein the polyhedral spherical denitrifying packing is prepared from one of polyethylene and polypropylene, one of calcium carbonate and talcum powder, and glass fiber at a mass ratio of (80-95):(1-10):(1-10), and
    wherein the polyhedral spherical denitrifying packing has a density of 1.03-1.2 g/cm$^3$.

2. The method of claim 1, wherein each of the conical pieces has a height of 10-20 mm.

3. The method of claim 1, wherein the polyhedral spherical denitrifying packing has a spherical inner diameter of 15-40 mm, and has a hollow interior.

4. The method of claim 1, wherein a filling ratio of the polyhedral spherical denitrifying packing is 25-60%.

* * * * *